(12) United States Patent
Xiang (10) Patent No.: US 7,749,945 B2
(45) Date of Patent: Jul. 6, 2010

(54) INVERT EMULSION DRILLING FLUID SYSTEMS COMPRISING AN EMULSIFIED AQUEOUS PHASE COMPRISING DISPERSED INTEGRAL LATEX PARTICLES

(75) Inventor: Tao Xiang, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 338 days.

(21) Appl. No.: 11/901,495

(22) Filed: Sep. 18, 2007

(65) Prior Publication Data

US 2008/0064612 A1 Mar. 13, 2008

Related U.S. Application Data

(63) Continuation-in-part of application No. 10/656,047, filed on Sep. 5, 2003, now Pat. No. 7,271,131, which is a continuation-in-part of application No. 10/634,334, filed on Aug. 1, 2003, which is a continuation of application No. 09/785,842, filed on Feb. 16, 2001, now Pat. No. 6,703,351.

(60) Provisional application No. 60/211,162, filed on Jun. 13, 2000.

(51) Int. Cl.
*C09K 8/58* (2006.01)
*E21B 43/16* (2006.01)
*B01F 3/12* (2006.01)

(52) U.S. Cl. .................... 507/231; 166/305.1; 507/203; 507/219; 507/269; 507/277; 516/20; 516/21; 516/22; 516/27

(58) Field of Classification Search ................ 507/125, 507/231, 103, 117, 140, 145, 203, 219, 269, 507/277; 516/22, 20, 21, 27
See application file for complete search history.

(56) References Cited

U.S. PATENT DOCUMENTS

| | | | | |
|---|---|---|---|---|
| 4,436,636 A | * | 3/1984 | Carnicom | 507/118 |
| 4,670,501 A | * | 6/1987 | Dymond et al. | 524/458 |
| 4,671,883 A | * | 6/1987 | Connell et al. | 507/107 |
| 5,605,879 A | | 2/1997 | Halliday et al. | |
| 5,837,655 A | | 11/1998 | Halliday et al. | |
| 5,851,958 A | | 12/1998 | Halliday et al. | |
| 6,204,224 B1 | * | 3/2001 | Quintero et al. | 507/123 |
| 6,308,788 B1 | * | 10/2001 | Patel et al. | 175/50 |
| 6,703,351 B2 | | 3/2004 | Stowe, II et al. | |
| 6,806,232 B1 | | 10/2004 | Cart | |
| 7,271,131 B2 | | 9/2007 | Halliday et al. | |
| 2002/0103291 A1 | * | 8/2002 | Westerman | 524/814 |
| 2004/0014821 A1 | | 1/2004 | Viradaraj | |
| 2004/0110644 A1 | | 6/2004 | Halliday et al. | |
| 2004/0132625 A1 | | 7/2004 | Halliday et al. | |
| 2006/0116294 A1 | | 6/2006 | Xiang et al. | |
| 2006/0270562 A1 | | 11/2006 | Xiang et al. | |
| 2007/0056774 A9 | | 3/2007 | Giroux et al. | |

OTHER PUBLICATIONS

Letter sending search and examinination report from the UK Patent Office mailed Oct. 15, 2001 in connection with GB 0114390.8.
Information Disclosure Statement filed by Applicant in U.S. Appl. No. 09/785,842 mailed Sep. 11, 2002.
Office Action in U.S. Appl. No. 09/785,842 mailed Sep. 11, 2002.
Amendment and response filed in U.S. Appl. No. 09/785,842 mailed Nov. 14, 2002.
Office Action in U.S. Appl. No. 09/785,842 mailed Jun. 18, 2003.
Amendment and response filed in U.S. Appl. No. 09/785,842 mailed Aug. 15, 2003.
Information Disclosure Statement filed by Applicant in U.S. Appl. No. 10/656,047 received in OIPE Nov. 7, 2003.
Office Action mailed Nov. 1, 2005 in U.S. Appl. No. 10/656,047
Amendment and resonse filed in U.S. Appl. No. 10/656,047 mailed Dec. 13, 2005.
Office Action in U.S. Appl. No. 10/656,047 mailed Mar. 9, 2006.
Amendment in U.S. Appl. No. 10/656,047 mailed Jun. 9, 2006.
Office action in U.S. Appl. No. 10/656,047 mailed Jun. 23, 2006.
Second Amendment in U.S. Appl. No. 10/656,047 mailed Aug. 8, 2006.
Correspondence FAXed to USPTO on Sep. 7, 2006, in U.S. Appl. No. 10/656,047.
Office Action mailed Nov. 29, 2006 in U.S. Appl. No. 10/656,047.
Amendment and response filed Jan. 29, 2007 in U.S. Appl. No. 10/656,047.

* cited by examiner

*Primary Examiner*—Timothy J. Kugel
(74) *Attorney, Agent, or Firm*—Paula D. Morris; The Morris Law Firm, P.C.

(57) ABSTRACT

An invert emulsion fluid system and a method of performing petroleum recovery operations using an invert emulsion fluid system.

23 Claims, 3 Drawing Sheets

INVERT EMULSION DRILLING FLUID SYSTEMS COMPRISING AN EMULSIFIED AQUEOUS PHASE COMPRISING DISPERSED INTEGRAL LATEX PARTICLES

RELATED APPLICATIONS

The present application is related to: U.S. Pat. No. 6,703,351, issued Mar. 9, 2004, which was based on provisional application No. 60/211,162, filed on Jun. 13, 2000; U.S. Patent Application Publication No. 2004/0110644, published Jun. 10, 2004, based on an application filed Aug. 4, 2003 (pending), which was a continuation-in-part of application Ser. No. 09/785,842, filed Feb. 16, 2001, which issued as U.S. Pat. No. 6,703,351; U.S. Pat. No. 7,271,131, filed Sep. 5, 2003 and issued Sep. 18, 2007; and, U.S. Publication No. 2006/0116294, published Jun. 1, 2006, utility application filed Nov. 21, 2005 based on provisional application 60/632,090, filed Dec. 1, 2004.

FIELD OF THE APPLICATION

The present application provides invert emulsion fluid systems comprising an emulsified aqueous phase comprising dispersed integral latex particles.

BACKGROUND OF THE APPLICATION

Drilling fluid systems are formulated to have specific properties in order enhance success during petroleum recovery operations. Fluids used during petroleum recovery operations typically are classified according to whether the continuous phase of the fluid comprises water or oil. A water-base fluid comprises water as the continuous phase. An oil-base fluid comprises oil (or organic synthetic) as the continuous phase. An invert emulsion fluid comprises oil or organic synthetic as the continuous phase and an emulsified aqueous phase.

Invert emulsion fluid systems tend to exhibit high performance with regard to shale inhibition, borehole stability, and lubricity. Unfortunately, invert emulsion fluid systems also have a high risk of "loss of circulation."

"Loss of circulation" generally refers to loss of whole drilling fluid in quantity to the formation. Loss of circulation generally occurs when a drilling fluid system contacts certain subsurface defects during petroleum recovery operations. Examples of such subsurface defects include, but are not necessarily limited to: (1) natural or intrinsic fractures, (2) induced or created fractures; (3) cavernous formations (crevices and channels), and (4) unconsolidated or highly permeable formations (loose gravel and/or sand). Loss of circulation can have very costly and even catastrophic consequences, including shutdown of petroleum recovery operations.

U.S. Pat. No. 6,703,351 describes water base drilling fluid systems comprising polymer latex, which is said to be "capable of providing a deformable latex film or seal on at least a portion of a subterranean formation." Id. at col. 3, ll. 24-26. In certain circumstances, however, it is desirable to use an oil base drilling fluid system during petroleum recovery operations.

U.S. Publication No. 2004/0132625 describes a latex additive for addition to oil base drilling fluid systems. Unfortunately, the latex additive comprises an aqueous carrier.

The addition to an oil base drilling fluid system of a latex additive comprising an aqueous carrier alters the water-to-oil ratio of the oil base drilling fluid system. In essence, the oil base drilling fluid system becomes an unbalanced invert emulsion drilling fluid system having different rheological properties. For example, plastic viscosity (PV) and/or yield point (YP) tends to be higher in the resulting unbalanced system. See initial and "final" properties of Formula 25 and 26 in Table III, U.S. Publication No. 2004/0132625. An increase in PV and/or YP can increase the equivalent circulating density ("ECD") of the invert emulsion fluid system, which, in turn, can decrease the ability of the latex additive to reduce loss of circulation.

It is possible to rebalance an unbalanced invert emulsion fluid system. However, an unbalanced invert emulsion fluid system would either have to be rebalanced in the field or transported offsite to be rebalanced. Either option renders the use of latex additive comprising aqueous carrier inefficient.

BRIEF SUMMARY

The present application provides balanced invert emulsion fluid systems comprising integral latex particles.

In one embodiment, the application provides an invert emulsion fluid system comprising: a continuous phase comprising oil and viscosifier; and, an emulsified aqueous phase comprising dispersed integral latex particles.

In one embodiment, the application provides an invert emulsion fluid system comprising: a continuous phase comprising oil and organophilic clay; and, an emulsified aqueous phase comprising brine comprising one or more monovalent salt, 5 wt. % or less multivalent salt, polyamide surfactant, and emulsified integral latex particles.

In one embodiment, the application provides a method of performing petroleum recovery operations using an oil base fluid system comprising: providing an invert emulsion fluid system having an initial yield point, the invert emulsion fluid system comprising a continuous phase comprising oil and an emulsified aqueous phase comprising dispersed integral latex particles; and, maintaining effective fluid loss control properties and effective rheological properties while performing the petroleum recovery operations using the invert emulsion fluid system.

DETAILED DESCRIPTION

The present application provides invert emulsion fluid systems comprising an emulsified aqueous phase comprising dispersed integral latex particles. As used herein, the word "integral" means that the invert emulsion fluid system is formulated before transport to the field with the latex particles as an integral component. The invert emulsion fluid systems maintain effective rheology and reduce loss of circulation during petroleum recovery operations without the need for rebalancing in the field and/or transport offsite to be rebalanced. The invert emulsion fluid systems are particularly advantageous for use during drilling operations through highly permeable formations. In one embodiment, the invert emulsion fluid systems are used during drilling operations through depleted sand formations.

The invert emulsion fluid systems of the present application comprise an oil base and an emulsified aqueous phase comprising dispersed integral latex particles. In one embodiment, the dispersed integral latex particles, themselves, are emulsified in the aqueous phase. In this embodiment, the drilling fluid systems are sometimes referred to as multiple emulsions, or "oil-in-water-in-oil" ("o/w/o") fluid systems.

The invert emulsion fluid systems of the present application present different problems than the water base drilling fluid systems described in U.S. Pat. No. 6,703,351 ("the '351 patent"). In the '351 patent, the aqueous continuous phase comprising the latex particles directly contacts the borehole wall during drilling operations. As a result, the latex particles accumulate directly from the continuous phase to plug or seal subsurface defects.

In contrast, when performing drilling operations using an invert emulsion drilling fluid system, it is the oil base continuous phase that directly contacts the borehole wall. The latex particles are not dispersed in the oil base continuous phase. Rather, the latex particles are dispersed in the emulsified aqueous phase. In fact, one of the advantages of invert emulsion fluids is that they can achieve at least some of the benefits of having an aqueous phase without requiring the aqueous phase to be in direct contact with the borehole wall. It was unclear whether the latex particles dispersed in the emulsified aqueous phase would be available to plug or seal subsurface defects.

Applicants have determined that integral latex particles dispersed in the emulsified aqueous phase of an invert emulsion drilling fluid system do reduce fluid loss. Without limiting the application to a particular mechanism of action, upon exposure to shear the droplets of the emulsified aqueous phase (the "w" in the "o/w/o" drilling fluid) are believed to become deformed and/or to break and release the latex particles into contact with the surrounding substrate.

The invert emulsion fluid systems of the present application have a variety of uses. In one embodiment, the invert emulsion fluid systems are used in applications where rheology and fluid loss control properties are important. In one embodiment, the invert emulsion fluid systems are drilling fluid systems. Drilling fluid systems include, for example, drilling fluids, drill-in fluids, completion fluids, workover fluids, and/or lost circulation pills.

The continuous phase of the invert emulsion fluid system comprises "oil." The "oil" may be substantially any organic material that forms a continuous phase and is non-toxic and sufficiently biodegradable according to requirements at the location used. In one embodiment, the oil is selected from the group consisting of olefins, paraffins, water insoluble polyglycols, water insoluble esters, diesel fuels, water insoluble Fischer-Tropsch reaction products, and combinations thereof. Examples of suitable olefins include but are not necessarily limited to polyalphaolefins, linear alpha olefins, and internal olefins, typically skeletally isomerized olefins. In one embodiment, the oil comprises synthetic olefins. In one embodiment, the oil comprises a blend of olefin and ester. In one embodiment, the oil comprises CF-2002™, an olefin/ester blend available from Baker Hughes Drilling Fluids. In one embodiment, the olefins are described in U.S. Pat. Nos. 5,605,872 and 5,851,958, incorporated herein by reference. Suitable paraffins are described, for example, in U.S. Pat. No. 5,837,655, incorporated herein by reference.

As used herein, the term "non-toxic" is defined to mean that the invert emulsion fluid system meets the applicable EPA requirements for discharge into U.S. waters. Currently, a drilling fluid must have an $LC_{50}$ of 30,000 parts per million (ppm) suspended particulate phase (SPP) or higher to meet EPA standards. The $LC_{50}$ is the concentration at which 50% of exposed 4-6 day old *Mysidopsis bahia* shrimp are killed. Suitable invert emulsion fluid systems meet relevant environmental standards in the location of operation.

The emulsified aqueous phase (the "w" in "o/w/o") comprises water or is water-based. An example of a water-based emulsified aqueous phase is brine. Suitable brine may comprise substantially any salt commonly used in formulating such fluid systems, including, but not necessarily limited to calcium chloride, sodium chloride, potassium chloride, magnesium chloride, calcium bromide, sodium bromide, potassium bromide, calcium nitrate, sodium formate, potassium formate, cesium formate, and mixtures thereof. In one embodiment, the aqueous internal phase comprises brine having a salt content of about 5 wt. % or more. In one embodiment, the aqueous internal phase comprises brine having a salt content of about 26 wt. % or less. In one embodiment, the brine comprises one or more monovalent salts. In one embodiment, the brine comprises 5 wt. % or less multivalent salt. In one embodiment, the brine comprises 0 wt. % multivalent salt.

The latex may be substantially any polymer latex. Suitable latex includes, for example latex particles, liquid latex, and/or redispersible powered latex. In one embodiment, the latex is liquid latex. Liquid latex generally comprises latex particles dispersed in an aqueous carrier. In one embodiment, the carrier is water. In one embodiment, the carrier comprises water and additional materials. For example, the carrier may comprise water, salt, anti-freezing agents, alcohols, glycols, glycerin, amines and other organofunctional compounds. Suitable materials include for example, those described in U.S. Pat. No. 7,067,460 "Organofunctional compounds for shale stabilization of the aqueous dispersed phase of non-aqueous based invert emulsion drilling system fluids," incorporated herein by reference, and other additives.

Substantially any polymer latex may be used. Suitable polymer latexes include, for example, sulfonated styrene/butadiene copolymer, carboxylated styrene/butadiene copolymer, polymethyl methacrylate, polyethylene, polyvinylacetate copolymers, polyvinyl acetate/vinyl chloride/ethylene copolymers, polyvinyl acetate/ethylene copolymers, natural latex, polydimethylsiloxanes, and combinations thereof. In one embodiment, the latex comprises sulfonated styrene/butadiene copolymers. In one embodiment, the polymer latex is MAX-SHIELD®, a sulfonated styrene/butadiene copolymer additive commercially available from Baker Hughes Drilling Fluids.

In one embodiment, the invert emulsion fluid system does not comprise added surfactant. In one embodiment, the invert emulsion fluid system does comprise added surfactant. Where used, added surfactant is believed to interact with moieties at the surface of the latex particles and to assist in maintaining the latex particles dispersed or emulsified in the emulsified aqueous phase. In one embodiment, one or more surfactant substantially coats the latex particle. Suitable surfactants for use in the invert emulsion fluid system include, for example, betaines, alkali metal alkylene acetates, sultaines, ether carboxylates, and mixtures thereof. Where used, the amount of added surfactant generally is about 5 vol. % or less, based on the total volume of the latex particles. In one embodiment, the amount of added surfactant generally is about 0.1 vol. % or more, based on the total volume of the latex particles.

In one embodiment, the invert emulsion fluid system comprises one or more suitable viscosifiers. Suitable viscosifiers include, for example, organophilic clays, asphaltic materials, lignitic materials, and/or oil soluble polymers. In one embodiment, the amount of viscosifier is about 1 g/l or more, based on the total weight of the invert emulsion fluid system. In one embodiment, the amount of viscosifier is 50 g/l or less, based on the total weight of the invert emulsion fluid system. In one embodiment, the one or more viscosifiers also provide filtration control for the invert emulsion fluid system. Filtration control generally is provided by forming a thin impermeable but dispersible filter cake. Suitable viscosifiers are non-toxic.

A wide variety of other additives may be used in the invert emulsion fluid systems. Such additives include, for example, shale stabilizer(s), filtration control additive(s), suspending agent(s), dispersant(s), thinner(s), anti-balling additive(s), lubricant(s), weighting agent(s), seepage control additive(s), other lost circulation additive(s), drilling enhancer(s), penetration rate enhancer(s), corrosion inhibitor(s), acid(s), base(s), buffer(s), scavenger(s), gelling agent(s), crosslinker(s), catalyst(s), soluble salts, biocides; one or more bridging and/or weighting agents, and combinations thereof.

The invert emulsion fluid systems do not require the presence of a precipitating agent in order to reduce loss of circulation. An optional component is precipitating agent. Suitable precipitating agents include, for example, silicates, aluminum complexes, and mixtures thereof. Suitable aluminum complexes include, for example, sodium aluminate, $NaAl_2O_2$, sometimes written as $Na_2OAl_2O_3$, aluminum hydroxide, aluminum sulfate, aluminum acetate, aluminum nitrate, potassium aluminate, and the like, and mixtures thereof (especially at pH of >9 for these compounds to be soluble in water). The amount of optional precipitating agent may be from about 5 to about 50 g/l, based on the total weight of the invert emulsion fluid system. In one embodiment, the amount of optional precipitating agent is from about 10 g/l to about 25 g/l, based on the total weight of the invert emulsion fluid system. Without being limited to a particular mechanism of action, it is believed that, where present, precipitating agent chemically bonds to the surface of clay lining the borehole, providing a highly active polar surface to which the latex may bond.

In one embodiment, the invert emulsion fluid system comprises optional precipitating agent. In one embodiment, the optional precipitating agent is maintained in a metastable form in the aqueous phase of invert emulsion fluid system. The precipitating agent is in a metastable form if it is in suspension or solution, but precipitates out upon the borehole wall. In one embodiment, the precipitating agent comprises an aluminum compound. Typically, aluminum compounds are added to the invert emulsion fluid system on site. If added to the invert emulsion fluid system earlier, aluminum compounds tend to be unstable and to precipitate prematurely.

The invert emulsion fluid system is prepared by mixing the components for a period of time with agitation. In one embodiment, the invert emulsion fluid system is prepared by mixing latex (liquid or powdered) with an aqueous fluid. In one embodiment, the aqueous fluid is water. In one embodiment, the aqueous fluid is brine. In one embodiment, the amount of latex mixed with the aqueous fluid is about 50 wt. % or less, based on the total weight of the final aqueous solution. In one embodiment, the aqueous fluid and the latex are mixed with agitation for a period of time sufficient to produce an aqueous solution comprising dispersed latex particles. In one embodiment, any added surfactant and/or precipitating agent is added to the final aqueous solution before mixing the final aqueous solution into oil to produce the invert emulsion. In one embodiment, any viscosifiers and/or fluid loss control agents may be added to the oil phase before or after mixing the final aqueous solution into the oil phase. The combination of the oil base and the final aqueous solution is mixed under conditions effective to produce an invert emulsion. Generally, the components are mixed together in any order under agitation conditions.

In order to be effective, the invert emulsion fluid system has effective rheology. The invert emulsion fluid system has sufficient structure to suspend bridging agents but acceptable equivalent circulating density.

Initial and final rheology may be assessed in the laboratory by measuring initial and final Bingham Plastic rheological properties. Initial Bingham Plastic properties are measured after a fluid is mixed or prepared. Final Bingham Plastic rheological properties are generally measured after hot rolling at elevated temperature for a period of time. In one embodiment, Bingham Plastic rheological properties are measured after hot rolling at 121° C. (250° F.) for about 16 hours. The rheological properties typically assessed include: plastic viscosity; ten second gel strength; ten minute gel strength.

Some variability between the initial and final Bingham Plastic rheological properties is acceptable. However, it is desirable for the final Bingham Plastic rheological properties of the invert emulsion fluid system (the "test sample") comprising the integral latex particles dispersed in the emulsified aqueous phase to remain as close to the original Bingham Plastic rheological properties as possible.

In one embodiment, the final yield point of the test sample is within 20% of the initial yield point of the test sample. In one embodiment, the final yield point of the test sample is within 15% of the initial yield point of the test sample. In one embodiment, the final yield point of the test sample is within 12% of the initial yield point of the test sample. In one embodiment, the final yield point of the test sample is within 10% of the initial yield point of the test sample. In one embodiment, the final yield point of the test sample is within 5% of the initial yield point of the test sample. In one embodiment, the final yield point of the test sample is substantially the same as the initial yield point of the test sample.

In one embodiment, final ten second gel strength of the test sample is within 20% of the initial gel strength of the test sample. In one embodiment, the final ten second gel strength of the test sample is within 17% of the initial gel strength of the test sample. In one embodiment, the final ten second gel strength of the test sample is within 10% of the initial gel strength of the test sample. In one embodiment, the final ten second gel strength of the test sample is within 5% of the initial gel strength of the test sample. In one embodiment, the final ten second gel strength of the test sample is within 2% of the initial gel strength of the test sample. In one embodiment, the final ten second gel strength of the test sample is substantially the same as the initial gel strength of the test sample.

In one embodiment, the final ten minute gel strength of the test sample is within 20% if the initial ten minute gel strength of the test sample. In one embodiment, the final ten minute gel strength of the test sample is within 15% of the initial ten minute gel strength of the test sample. In one embodiment, the final ten minute gel strength of the test sample is within 10% of the initial ten minute gel strength of the test sample. In one embodiment, the final ten minute gel strength of the test sample is within 5% of the initial ten minute gel strength of the test sample. In one embodiment, the final ten minute gel strength of the test sample is within 2% of the initial ten minute gel strength of the test sample. In one embodiment, the final ten minute gel strength of the test sample is the same as the initial ten minute gel strength of the test sample.

The absolute value of desirable Bingham Plastic rheological properties may vary. In one embodiment, the final yield point of the test sample is about 8.8 N/m² (18 lb/100 sq ft) or less. In one embodiment, the final ten second gel strength of the test sample is about 3.9 N/m (8 lb/100 sq ft) or less. In one embodiment, the final ten minute gel strength of the test sample is about 7.3 N/m (15 lb/100 sq ft) or less (measured using a FANN 35A viscometer).

The invert emulsion fluid system comprising integral latex particles dispersed in the emulsified aqueous phase also reduces high temperature, high pressure ("HTHP") fluid loss compared the same brine-in-oil emulsion absent the dispersed integral latex particles. As used herein, the HTHP fluid loss is measured after hot rolling the invert emulsion fluid system at 121° C. (250° F.) for 16 hours Any improvement in HTHP fluid loss is encompassed by the present application.

In one embodiment, the HTHP fluid loss is the amount of fluid that passes through a 0.75 micron Darcy disk after 30 minutes at a pressure differential of 35.15 Kg/cm² (500 psi) and a temperature of 121° C. (250° F.). In this embodiment, the test sample exhibits a HTHP fluid loss at 100 minutes or more that is about 10% or more less than the HTHP fluid loss exhibited by a control comprising the same fluid system in the absence of the dispersed integral latex particles under the same conditions. In one embodiment, the test sample exhibits a HTHP fluid loss at 100 minutes or more that is about 15% or more less than that exhibited by the control. In one embodiment, the test sample exhibits a HTHP fluid loss at 100 minutes or more that is about 20% or more less than that exhibited by a control. In one embodiment, the test sample exhibits a HTHP fluid loss at 100 minutes or more that is about 25% or more less than that exhibited by a control.

In one embodiment, the test sample reduces HTHP fluid loss through a 0.4 micron Darcy disk after 100 minutes at a pressure differential of 35.15 Kg/cm² (500 psi) and a temperature of 121° C. (250° F.). In this embodiment, the test sample exhibits a HTHP fluid loss at 100 minutes or more that is about 15% or more less than the HTHP fluid loss exhibited by a control comprising the same fluid system in the absence of the dispersed integral latex particles under the same conditions. In one embodiment, the test sample exhibits a HTHP fluid loss at 100 minutes or more that is about 20% or more less than that exhibited by the control. In one embodiment, the test sample exhibits a HTHP fluid loss at 100 minutes or more that is about 25% or more less than that exhibited by a control. In one embodiment, the presence of the integral latex eliminates HTHP fluid loss through a Darcy disk at 100 minutes or more.

The application will be better understood with reference to the following examples, which are illustrative only and should not be construed as limiting the claims. In the following examples, emulsion stability typically is measured by measuring the electrical stability of the fluid. Electrical stability typically is determined by applying a voltage-ramped, sinusoidal electrical signal across a pair of parallel flat-plate electrodes immersed in the fluid. The resulting current remains low until a threshold voltage is reached. The current then rises very rapidly. The threshold voltage is the electrical stability value of the fluid, and is defined as the voltage in peak volts-measured when the current reaches 61 μA.

EXAMPLE 1

Figure 1:
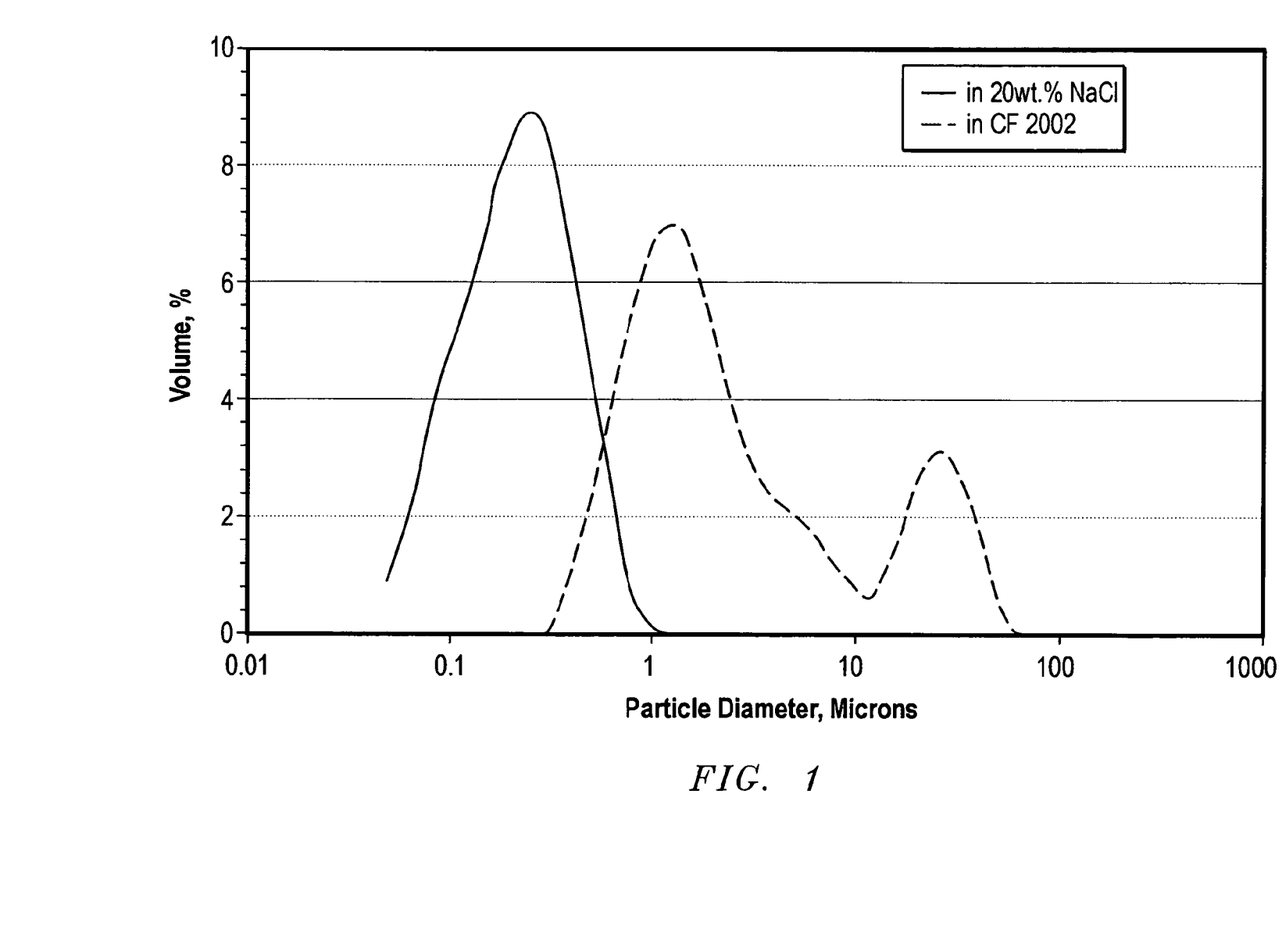
FIG. 1 is a graph comparing the particle size distribution of the latex particles found in MAX-SHIELD® (water and about 50 wt. % latex particles comprising sulfonated styrene/butadiene copolymers) in (a) 20 wt. % NaCl in water, or (b) CF-2002™.

FIG. 1 is a graph comparing the particle size distribution of MAX-SHIELD® (about 50 wt % sulfonated styrene/butadiene particles dispersed in water) in (a) 20 wt. % NaCl in water, or (b) CF-2002. The particle size was measured by a Malvern Mastersizer Particle Size Analyzer. The average diameter of the latex particles in the CF-2002™ was approximately 1-2 microns. In contrast, the average diameter of the latex particles in the NaCl solution was about 0.1-0.2 microns. The foregoing implies that the water droplets in the CF-2002™ contained about 500 latex particles.

EXAMPLE 2

The following fluids were prepared and the rheological properties were measured. All fluids were mixed and measurements performed according to Recommended Practice Standard Procedure for Field Testing Oil-Based Drilling Fluids, API Recommended Practice 13B-2, Third Edition February 1998, and/or established Baker Hughes Drilling Fluid procedures. The ingredients were mixed in the order shown in the table, using a Prince Castle mixer at 11000 rpm for 30 minutes.

Initial Bingham Plastic rheological properties of plastic viscosity, yield point, ten second gels, and ten minute gels were measured using a FANN 35A viscometer at 120° F. (49° C.). Electrical stability also was measured. The components and results are given in the following Table:

| Formulation | Unweighted Brine-in-Oil | Unweighted Latex-in-Brine-in-Oil |
|---|---|---|
| CF-2002 ™, ml | 200 | 200 |
| CARBO-GEL ®, g | 2 | 2 |
| OMNI-MUL ® US, g | 16 | 16 |
| 25 wt % CaCl$_2$, ml | 35 | — |
| 1:1 20 wt % NaCl and MAX-SHIELD ®, ml | — | 35 |
| 600 rpm at 120° F. (49° C.) | 128 | 117 |
| 300 rpm | 93 | 80 |
| 200 rpm | 75 | 65 |
| 100 rpm | 51 | 47 |
| 6 rpm | 15 | 13 |
| 3 rpm | 12 | 10 |
| PV, cP | 35 | 37 |
| YP, N/m (lb/100 ft$^2$) | 0.98 (2) | 2.44 (5) |
| 10 second gel, N/m (lb/100 ft$^2$) | 0.49 (1) | 1.46 (3) |
| 10 minute gel, N/m (lb/100 ft$^2$) | 0.49 (1) | 2.93 (6) |
| Electric Stability, volt | 544 | 1898 |

The fluid actually used was SYN-TEQ®, a synthetic-base drilling fluid comprising olefin isomers available from Baker Hughes Drilling Fluids. In the example, the SYN-TEQ® comprised: CF-2002™, a non-toxic, biodegradable olefin and ester blend; CARBO-GEL®, an organophilic amine-treated hectorite clay; and, OMNI-MUL®, a polyamide used as a non-ionic emulsifier and wetting agent in synthetic- and oil-base drilling fluids. MAX-SHIELD® is a latex additive comprising water and about 50 wt. % latex particles comprising sulfonated styrene/butadiene copolymers.

Based on the foregoing results, the unweighted latex-in-brine-in-oil emulsion had acceptable rheological properties and an electrical stability value that was over three times the electrical stability value of the unweighted brine-in-oil.

EXAMPLE 3

Figure 2:
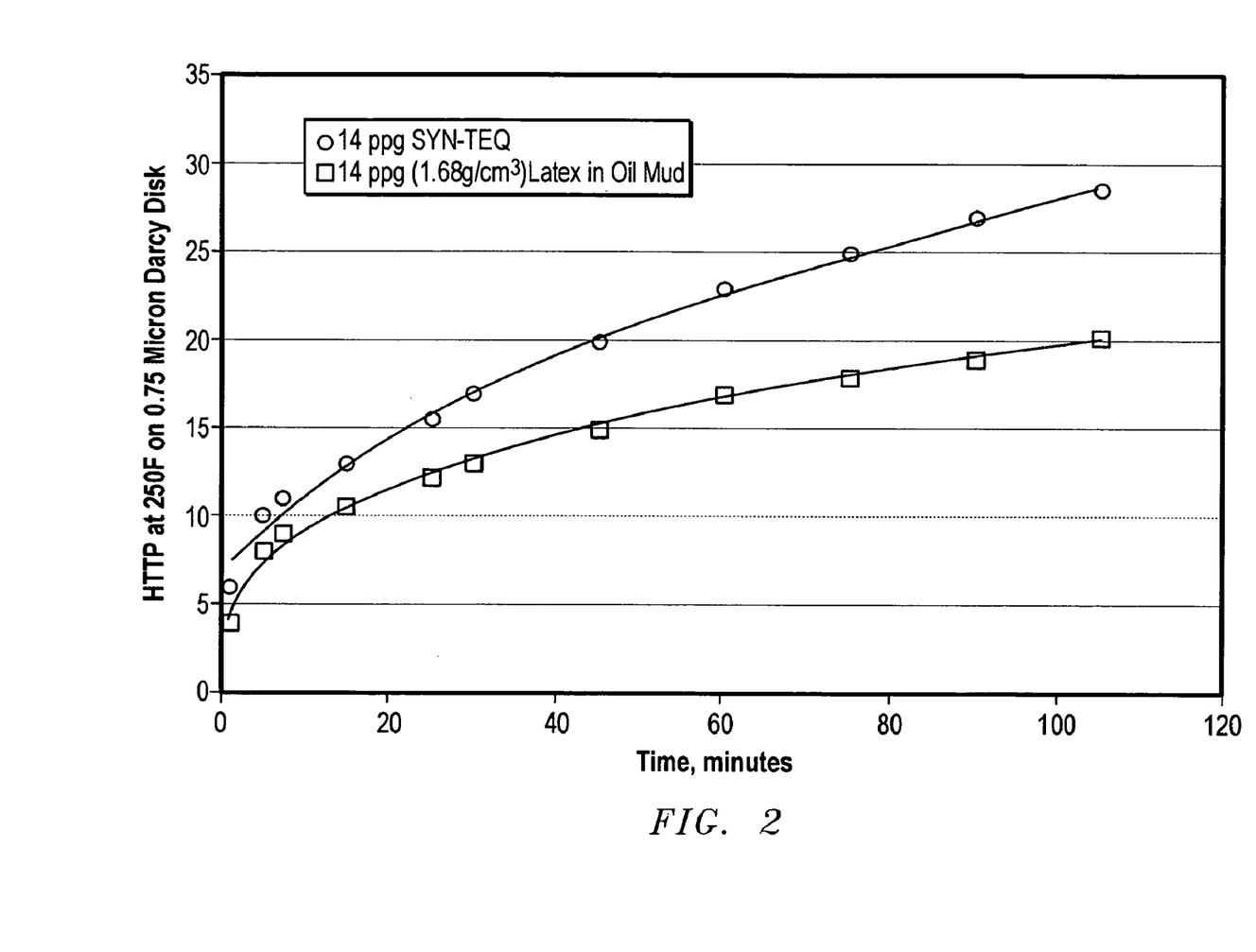
FIG. 2 is graph comparing the high temperature, high pressure (HTHP) fluid loss over time of the two drilling fluid systems of Example 3 through a 0.75 micron Darcy disk.
Figure 3:
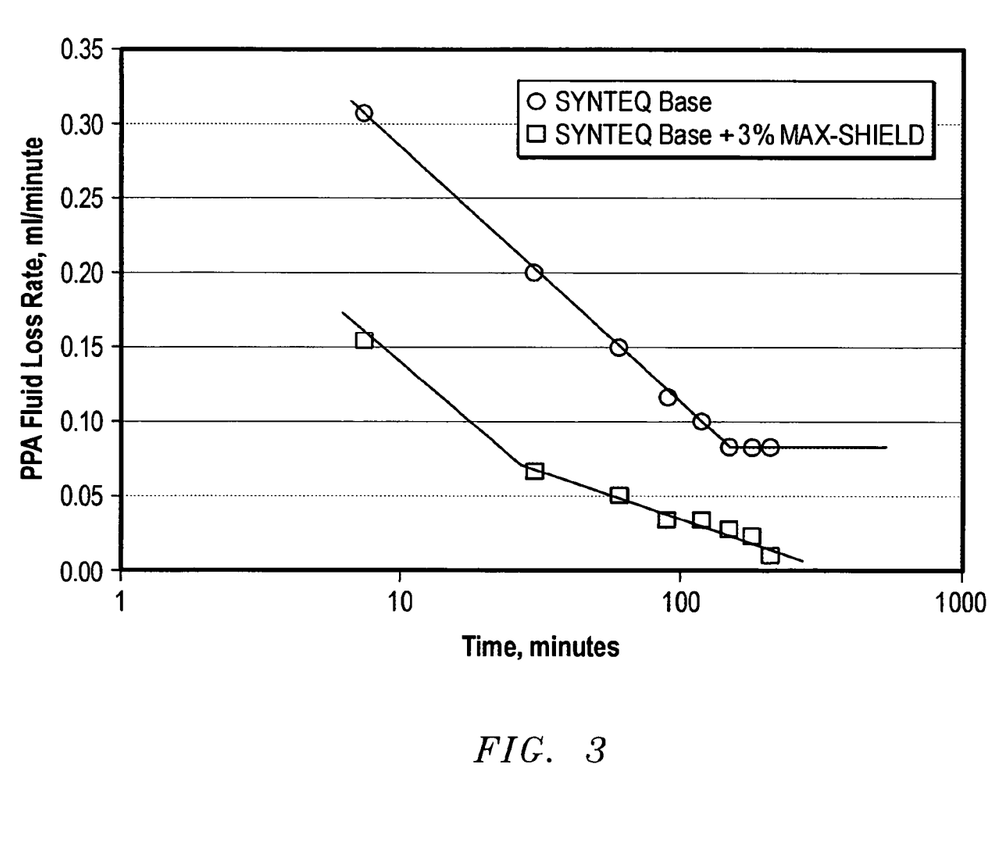
FIG. 3 is graph comparing the HTHP fluid loss over time of the two drilling fluid systems of Example 3 through a 0.4 micron Darcy disk.

Fluids having the composition shown in the following Table were prepared and measurements made using the procedures of Example 1. In addition, HTHP fluid loss at 121° C. (250° F.) through 0.4 micron and 0.75 micron Darcy disks was measured before and after aging. The Darcy disks conformed to ASTM E11 requirements. The fluid loss over time is shown in FIGS. 2 and 3. Results are given in the following Table:

| | (1.68 g/cm³) 14 ppg brine-in-oil | (1.68 g/cm³) 14 ppg latex-in-brine-in-oil |
|---|---|---|
| CF-2002 ™, m³ (bbl) | 0.09 (0.57) | 0.09 (0.57) |
| CARBO-GEL ®, g/l (lb/bbl) | 5.7 (2) | 5.7 (2) |
| OMNI-MUL ® US, g/l (lb/bbl) | 45.1 (16) | 45.1 (16) |
| 25 wt. % CaCl₂, m³ (bbl) | 0.016 (0.1) | — |
| 1:1 20 wt. % NaCl and MAX-SHIELD ®, m³ (bbl) | — | 0.016 0.016 (0.1) |
| MIL-BAR ™, g/l (lb/bbl) | 934 (327) | 934 (327) |
| CARBO-TROL ® HT, g/l (lb/bbl) | 5.7 (2) | 5.7 (2) |
| REV DUST ™, g/l (lb/bbl) | 78 (27) | 78 (27) |
| Initial Properties | | |
| | 49° C. (120° F.) | 66° C. (150° F.) | 49° C. (120° F.) | 66° C. (150° F.) |
| 600 rpm @ 49° C. (120° F.) | 54 | 43 | 69 | 55 |
| 300 rpm | 32 | 24 | 39 | 32 |
| 200 rpm | 24 | 18 | 30 | 24 |
| 100 rpm | 16 | 12 | 18 | 15 |
| 6 rpm | 6 | 4 | 6 | 5 |
| 3 rpm | 5 | 3 | 5 | 5 |
| PV, Cp | 22 | 19 | 30 | 23 |
| YP, N/m (lb/100 ft²) | 4.88 (10) | 2.44 (5) | 4.39 (9) | 4.39 (9) |
| 10" Gel, N/m (lb/100 ft²) | 2.93 (6) | 1.95 (4) | 2.93 (6) | 2.93 (6) |
| 10' Gel, N/m (lb/100 ft²) | 3.9 (8) | 3.42 (7) | 5.86 (12) | 4.88 (10) |
| Density, g/cm³ (lb/gal) | 1.69 (14.1) | | 1.68 (14.0) | |
| Electric Stability | 1168 | | 942 | |
| HTHP@121° C. (250° F.) on 0.4 micron Darcy Disk, ml/30 min | 17.0 | | 11.0 | |
| HTHP@121° C. (250° F.) on 0.75 micron Darcy Disk, ml/30 min | 17.0 | | 13.0 | |
| After HR @121° C. (250° F.) for 16 hours | | | | |
| 600 rpm @ 49° C. (120° F.) | 57 | | 74 | |
| 300 rpm | 32 | | 42 | |
| 200 rpm | 23 | | 31 | |
| 100 rpm | 15 | | 19 | |
| 6 rpm | 4 | | 5 | |
| 3 rpm | 3 | | 5 | |
| PV, Cp | 25 | | 32 | |
| YP, N/m (lb/100 ft²) | 3.42 (7) | | 4.88 (10) | |
| 10" Gel, N/m (lb/100 ft²) | 2.93 (6) | | 3.42 (7) | |
| 10' Gel, N/m (lb/100 ft²) | 5.37 (11) | | 5.86 (12) | |
| Density, g/cm³ (lb/gal) | 1.69 (14.1) | | 1.68 (14.0) | |
| Electric Stability | 933 | | 597 | |
| HTHP@121° C. (250° F.) on 0.75 micron Darcy Disk, ml/30 min | 16.0 | | 12.0 | |

REV-DUST™ is a simulated drilled product which may be obtained from Mil-White Company, Houston, Tex. The following are commercially available from Baker Hughes Drilling Fluids: MIL-BAR™, a barite additive; and, CARBO-TROL®, a high-temperature softening-point gilsonite.

The latex-in-brine-in-oil drilling fluid exhibited less fluid loss (12.0 ml) than the brine-in-oil drilling fluid (16.0). FIGS. 2 and 3 are graphs comparing the HTHP fluid loss of the two aged fluid systems over time through 0.75 micron and 0.4 micron Darcy disks. Less fluid loss was seen in the latex-in-brine-in-oil fluid system even though the electrical stability of the latex-in-brine-in-oil fluid system was substantially less than the electrical stability of the brine-in-oil fluid system.

A latex-in-brine-in-oil (o/w/o) fluid system provides clear advantages compared to a brine-in-oil fluid system. The advantages would be most evident drilling unconsolidated or highly permeable formations including, for example, depleted sand formations.

COMPARATIVE EXAMPLE 4

The rheological properties of Formulations 25 and 26 in Table III of Application Publication No. 2004/0132625 were compared to the 1.68 g/cm³ (14 ppg) latex-in-brine-in-oil-fluid of Example 4. The results are given in the following Table:

| Formulation | Formula 25, Table III* | Current app., Example 4 | Formula 26, Table III* |
|---|---|---|---|
| CF-2002 ™, bbl(m³) | 0.57 (0.09) | 0.57 (0.09) | 0.57 (0.09) |
| CARBO-GEL ®, lb/bbl(g/l) | 2 (5.7) | 2 (5.7) | 2 (5.7) |
| OMNI-MUL ® US, lb/bbl (g/l) | 16 (45) | 16 (45) | 16 (45) |
| 25 wt. % CaCl₂, bbl (m³) | 0.1 (0.016) | — | 0.1 (0.016) |
| 1:1 20 wt. % NaCl and MAX-SHIELD ®, | — | 0.1 | — |
| MIL-BAR ™, lb/bbl (g/l) | 327 (935) | 327 (935) | 327 (935) |
| CARBO-TROL ® HT, lb/bbl | — | 2 | — |
| CARBOTEC ® S, lb/bbl (g/l) | 1 (3) | — | 1 (3) |
| RE-DUST ™, lb/bbl (g/l) | 27 (77) | 27 | 27 (77) |
| MAX-SHIELD ®, % by vol. | — | — | 3 |
| Initial Properties | | | |
| 600 rpm @ 120° F. (49° C.) | 62 | 69 | 81 |
| 300 rpm | 35 | 39 | 47 |
| 200 rpm | 25 | 30 | 36 |
| 100 rpm | 16 | 18 | 24 |
| 6 rpm | 5 | 6 | 9 |
| 3 rpm | 4 | 5 | 7 |
| PV, cP | 27 | 30 | 34 |
| YP, lb/100 ft² (N/m) | 8 (3.9) | 9 (4.4) | 13 (6.3) |
| 10" Gel, lb/100 ft² (N/m) | 6 (2.9) | 6 (2.9) | 10 (4.9) |
| 10' Gel, lb/100 ft² (N/m) | 7 (3.4) | 12 (5.9) | 12 (5.9) |
| Density, lb/gal (g/cm³) | 14.4 (1.73) | 14.0 (1.68) | 14.2 (1.71) |
| Electric Stability | 882 | 942 | 995 |
| HTHP@250° F. (121° C.) on 0.4 micron Darcy Disk, ml/30 min | 21 | 11 | 7 |
| After hot rolling @ 250° F. (121° C.) for 16 hours | | | |
| 600 rpm @ 120° F. (49° C.) | 77 | 74 | 96 |

-continued

| Formulation | Formula 25, Table III* | Current app., Example 4 | Formula 26, Table III* |
|---|---|---|---|
| 300 rpm | 45 | 42 | 59 |
| 200 rpm | 35 | 31 | 45 |
| 100 rpm | 23 | 19 | 30 |
| 6 rpm | 9 | 5 | 11 |
| 3 rpm | 7 | 5 | 9 |
| PV, cP | 32 | 32 | 37 |
| YP, lb/100 ft² (N/m) | 13 (6.3) | 10 (4.9) | 22 (10.7) |
| 10" Gel, lb/100 ft² (N/m) | 11 (5.4) | 7 (3.4) | 13 (6.3) |
| 10' Gel, lb/100 ft² (N/m) | 13 (6.3) | 12 (5.9) | 17 (8.3) |
| Density, lb/gal (g/cm³) | 14.4 (1.73) | 14.0 ((1.68) | 14.2 (1.71) |
| Electric Stability | 1073 | 597 | 895 |
| HTHP@250° F. (121° C.) on 0.75 Darcy Disk (10 μ), ml/30 min | 17.5 ml | 12.0 ml | 8.5 ml |

*Application Publication No. 2004/0132625.

The yield point of the aged experimental sample was maintained within 11% of the unaged experimental sample. In contrast, the yield point of the aged Formulas 25 and 26 were 62% and 69% greater than the unaged Formula 25 and 26, respectively.

The 10" gel point of the aged experimental sample was maintained within 17% of 10" gel point of the unaged experimental sample. In contrast, the 10" gel point of the aged Formulas 25 and 26 were 83% and 30% greater than the 10" gel point of the unaged Formulas 25 and 26, respectively.

The 10' gel point of the aged experimental sample was the same as the 10' gel point of the unaged experimental sample. In contrast, the 10' gel point of the aged Formulas 25 and 26 were 85+% and 41+% greater than the 10' gel point of the unaged Formulas 25 and 26, respectively.

Persons of ordinary skill in the art will recognize that many modifications may be made to the embodiments described herein. The embodiments described herein are meant to be illustrative only and should not be taken as limiting the invention, which will be defined in the claims.

I claim:

1. An invert emulsion fluid system comprising:
a continuous phase comprising oil and viscosifier; and,
an emulsified aqueous phase comprising a fluid loss control agent consisting essentially of dispersed integral latex particles.

2. The invert emulsion fluid system of claim 1 exhibiting a final yield point after hot rolling for 16 hours at 250° F. of about 18lb/100 sq ft or less.

3. The invert emulsion fluid system of claim 2 wherein:
the final ten second gel strength is about 8 lb/100 sq ft or less; and,
the final ten minute gel strength is about 15 lb/100 sq ft or less.

4. The invert emulsion fluid system of claim 3 wherein the viscosifier comprises organophilic clay.

5. The invert emulsion fluid system of claim 4 wherein the emulsified aqueous phase comprises brine comprising one or more monovalent salt and 5 wt. % or less multivalent salt.

6. The invert emulsion fluid system of claim 5 wherein the latex particles comprise sulfonated styrene/butadiene copolymers.

7. The invert emulsion fluid system of claim 6 wherein the dispersed integral latex particles are emulsified in the emulsified aqueous phase.

8. The invert emulsion fluid system of claim 3 wherein the dispersed integral latex particles are emulsified in the emulsified aqueous phase.

9. The invert emulsion fluid system of claim 3 further comprising polyamide surfactant.

10. The invert emulsion fluid system of claim 1 wherein the dispersed integral latex particles are emulsified in the emulsified aqueous phase.

11. The invert emulsion fluid system of claim 1 further comprising polyamide surfactant.

12. A method of performing petroleum recovery operations using the invert emulsion fluid system of claim 1.

13. An invert emulsion fluid system comprising:
a continuous phase comprising oil and organophilic clay; and,
an emulsified aqueous phase that comprises brine comprising one or more monovalent salt, 5 wt. % or less multivalent salt, polyamide surfactant, and a fluid loss control agent consisting essentially of emulsified integral latex particles.

14. The invert emulsion fluid system of claim 13 wherein the latex particles comprise sulfonated styrene/butadiene copolymers.

15. The invert emulsion fluid system of claim 14 wherein the oil comprises a blend comprising one or more olefins and one or more esters.

16. A method of performing petroleum recovery operations using the invert emulsion fluid system of claim 13.

17. A method of performing petroleum recovery operations using an oil base fluid system comprising:
providing an invert emulsion fluid system having an initial yield point, the invert emulsion fluid system comprising a continuous phase comprising oil and viscosifier, and an emulsified aqueous phase comprising a fluid loss control agent consisting essentially of dispersed integral latex particles; and,
maintaining effective fluid loss control properties and effective rheological properties while performing the petroleum recovery operations using the invert emulsion fluid system.

18. The method of claim 17 wherein:
the effective fluid loss control properties and the effective theological properties are reflected in the laboratory when the invert emulsion fluid system is aged by hot rolling at a temperature of 250° F. or more for 16 hours to produce an aged invert emulsion fluid system; and,
the aged invert emulsion fluid system exhibits a final rheology comprising:
a final yield point that is within 20% of the initial yield point;
a final ten second gel strength that is within 20% of the initial ten second gel strength; and,
a final ten minute gel strength that is within 20% of the initial ten minute gel strength; and,
the aged invert emulsion fluid system exhibits a first HTHP fluid loss through a 0.75 micron Darcy disk and through a 0.4 micron Darcy disk after 100 minutes at a pressure differential of 500psi and a temperature of 250° F. that is about 15% or more less than the HTHP fluid loss exhibited by a control comprising the same fluid system in the absence of the dispersed integral latex particles under the same conditions.

19. The method of claim 18 wherein the first HTHP fluid loss is about 25% or more less than the HTHP fluid loss exhibited by a control comprising the same fluid system in the absence of the dispersed integral latex particles under the same conditions.

20. The method of claim 19 wherein the final ten minute gel strength is within 5% of the initial ten minute gel strength.

21. The method of claim 19 wherein the final ten minute gel strength is within 2% of the initial ten minute gel strength.

22. The method of claim 18 wherein:
   the final yield point is within 12% of the initial yield point;
   the final ten second gel strength is within 17% of the initial ten second gel strength;
   the final ten minute gel strength is within 10% of the initial ten minute gel strength; and,
   the first HTHP fluid loss is about 20% or more less than the HTHP fluid loss exhibited by a control comprising the same fluid system in the absence of the dispersed integral latex particles under the same conditions.

23. The method of claim 18 wherein:
   the final yield point is within 10% of the initial yield point,
   the final ten second gel strength is within 17% of the initial ten second gel strength;
   the final ten minute gel strength is within 10% of the initial ten minute gel strength; and,
   the first HTHP fluid loss is about 20% or more less than the HTHP fluid loss exhibited by a control comprising the same fluid system in the absence of the dispersed integral latex particles under the same conditions.

* * * * *

UNITED STATES PATENT AND TRADEMARK OFFICE
CERTIFICATE OF CORRECTION

PATENT NO. : 7,749,945 B2  Page 1 of 1
APPLICATION NO. : 11/901495
DATED : July 6, 2010
INVENTOR(S) : Tao Xiang It is certified that error appears in the above-identified patent and that said Letters Patent is hereby corrected as shown below:

Column 12, Line 43, delete "theological" and insert therefore, --rheological--

Signed and Sealed this

Twenty-third Day of November, 2010

David J. Kappos
*Director of the United States Patent and Trademark Office*